US012590478B2

(12) United States Patent
    Kaneko

(10) Patent No.: US 12,590,478 B2
(45) Date of Patent: Mar. 31, 2026

(54) LID OPENING/CLOSING STRUCTURE

(71) Applicant: TOYODA GOSEI CO., LTD., Kiyosu (JP)

(72) Inventor: Kenichiro Kaneko, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 414 days.

(21) Appl. No.: 18/258,266

(22) PCT Filed: Dec. 17, 2021

(86) PCT No.: PCT/JP2021/046697
    § 371 (c)(1),
    (2) Date: Jun. 19, 2023

(87) PCT Pub. No.: WO2022/158197
    PCT Pub. Date: Jul. 28, 2022

(65) Prior Publication Data
    US 2024/0035317 A1     Feb. 1, 2024

(30)        Foreign Application Priority Data
    Jan. 19, 2021    (JP) ................................. 2021-006764

(51) Int. Cl.
    E05B 83/34        (2014.01)
    B60K 15/05        (2006.01)
(52) U.S. Cl.
    CPC .............. E05B 83/34 (2013.01); B60K 15/05 (2013.01)
(58) Field of Classification Search
    CPC . E05B 83/34; B60K 15/05; B60K 2015/0538; B60K 2015/0515

(Continued)

(56)        References Cited

U.S. PATENT DOCUMENTS 9,088,104 B2    7/2015   Kahara et al.
 2014/0170889 A1    6/2014   Kahara et al.
 2020/0269684 A1*   8/2020   Hegwein ................. E05B 81/06

FOREIGN PATENT DOCUMENTS

JP        2014-118693 A      6/2014
 JP        2019-108698 A      7/2019
            (Continued)

OTHER PUBLICATIONS

International Search Report dated Feb. 15, 2022, issued in corresponding International Patent Application No. PCT/JP2021/046697 (and English Machine Translation).

*Primary Examiner* — Rafael A Ortiz
(74) *Attorney, Agent, or Firm* — Posz Law Group, PLC

(57)        ABSTRACT

A lid opening/closing structure includes: a lid openable/closable with respect to a base member between a fully-closed position and a fully-opened position; a first power-applying mechanism to apply, to the lid, first power for opening/closing the lid with respect to the base member; and a second power-applying mechanism to apply, to the lid, second power different from the first power and being for opening/closing the lid with respect to the base member by an external force operation. The second power-applying mechanism has an engagement portion and a to-be-engaged portion. The engagement portion and the to-be-engaged portion are not engaged with each other when the lid is opened/closed between the fully-closed position and the fully-opened position by the first power, and are engaged with each other such that the lid is opened/closed by the second power being applied to the lid when the external force operation is performed.

8 Claims, 13 Drawing Sheets

(58) Field of Classification Search
      USPC .................................... 220/211; 49/280, 334
      See application file for complete search history.

(56)                    References Cited

FOREIGN PATENT DOCUMENTS

JP            2019108698       *   7/2019
JP            2019-199237  A      11/2019
JP            2020-111903  A       7/2020
WO       WO-2017026822  A1  *   2/2017    ............. E05B 81/25

* cited by examiner

42(53)

42(53)

LID OPENING/CLOSING STRUCTURE

CROSS-REFERENCE TO RELATED APPLICATIONS

This application is a U.S. national stage application of International Patent Application No. PCT/JP2021/046697 filed on Dec. 17, 2021, which claims priority to Japanese Patent Application No. 2021-006764 filed on Jan. 19, 2021, the disclosures of which are incorporated herein by reference.

TECHNICAL FIELD

The present invention relates to a lid opening/closing structure capable of opening/closing a lid for, for example, closing an opening in a vehicle body base member.

BACKGROUND

Hitherto, a lid opening/closing structure for opening/closing a lid for closing an opening in a vehicle body base member provided with a charging port, a fuel port, or the like has been known (e.g., Patent Literature 1). The lid opening/closing structure described in Patent Literature 1 includes a locking member capable of locking the lid at a fully-closed position, and an electric actuator for causing the locking member to advance/retract between a restriction position and a restriction release position. The above lid opening/closing structure also includes an emergency operation member capable of causing the locking member to retract from the restriction position to the restriction release position in an emergency in which a failure or the like occurs in the electric actuator.

In the above lid opening/closing structure, in a state where the lid is locked at the fully-closed position by the locking member, when the emergency operation member is operated by an operator, the lid is unlocked by the locking member retracting to the restriction release position, thereby allowing the lid to be opened. Therefore, even if the electric actuator fails, the lid is unlocked into an opened state.

PATENT LITERATURE

Patent Literature 1: JP2020-111903 (A)

However, the above electric actuator described in Patent Literature 1 is a device for causing the locking member, which is for locking the lid at the fully-closed position, to advance/retract between the restriction position and the restriction release position, but is not a device for closing/opening the lid itself.

SUMMARY

The present invention has been made in view of such circumstances, and an object of the present invention is to provide a lid opening/closing structure capable of ensuring opening/closing of a lid even when a failure occurs in an electric actuator for opening/closing the lid, or the like.

An aspect of the present invention is directed to a lid opening/closing structure including: a lid openable/closable with respect to a base member between a fully-closed position and a fully-opened position; a first power-applying mechanism configured to apply, to the lid, first power for opening/closing the lid with respect to the base member; and a second power-applying mechanism configured to apply, to the lid, second power different from the first power and being for opening/closing the lid with respect to the base member by an external force operation, wherein the second power-applying mechanism has an engagement portion and a to-be-engaged portion capable of being engaged with the engagement portion, and the engagement portion and the to-be-engaged portion are not engaged with each other when the lid is opened/closed between the fully-closed position and the fully-opened position by the first power, and are engaged with each other such that the lid is opened/closed by the second power being applied to the lid when the external force operation is performed.

With this configuration, when the external force operation is performed by the second power-applying mechanism, the engagement portion and the to-be-engaged portion are brought into engagement with each other, whereby the second power by the external force is applied to the lid and the lid is opened/closed. Therefore, even when the lid fails to be opened/closed by the first power by the first power-applying mechanism, the lid is opened/closed by the second power by the second power-applying mechanism.

DETAILED DESCRIPTION

Hereinafter, specific embodiments of the lid opening/closing structure according to the present invention will be described with reference to FIG. 1 to FIG. 24.

First Embodiment

Figure 1:
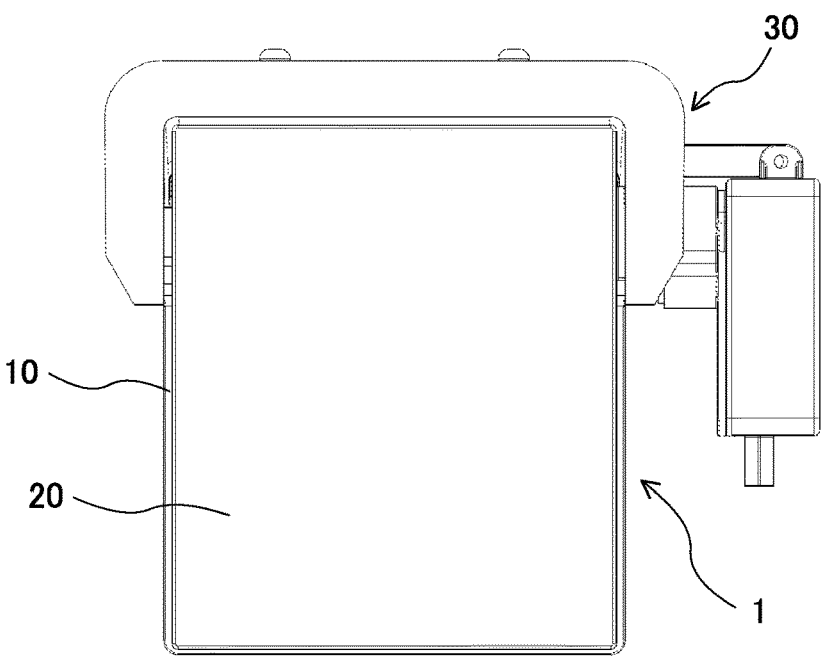
FIG. 1 is a front view of a lid opening/closing structure according to a first embodiment at a fully-closed position of a lid.
Figure 2:
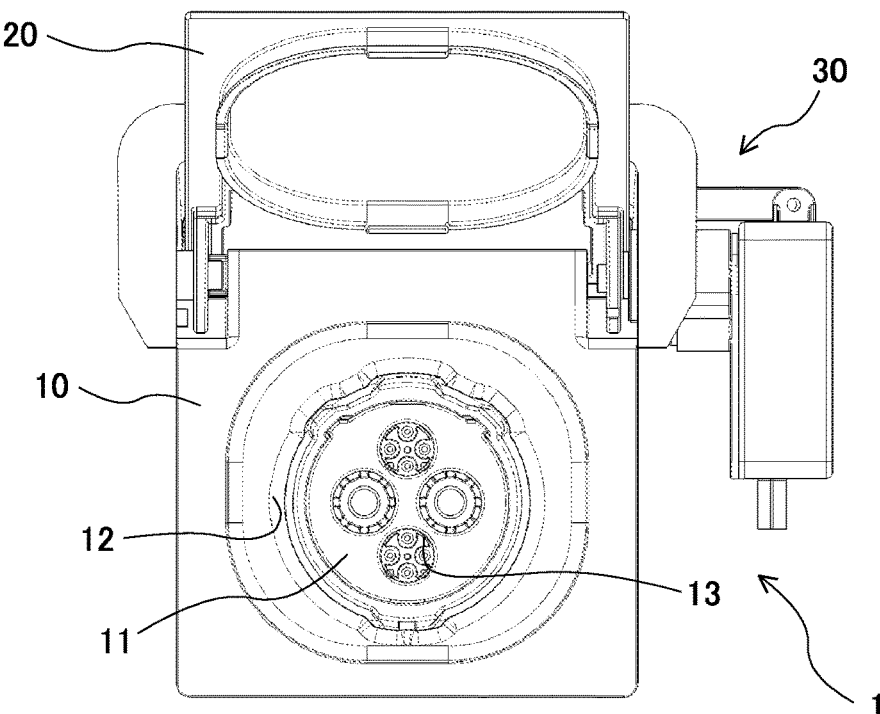
FIG. 2 is a front view of the lid opening/closing structure according to the first embodiment at a fully-opened position of the lid.
Figure 3:
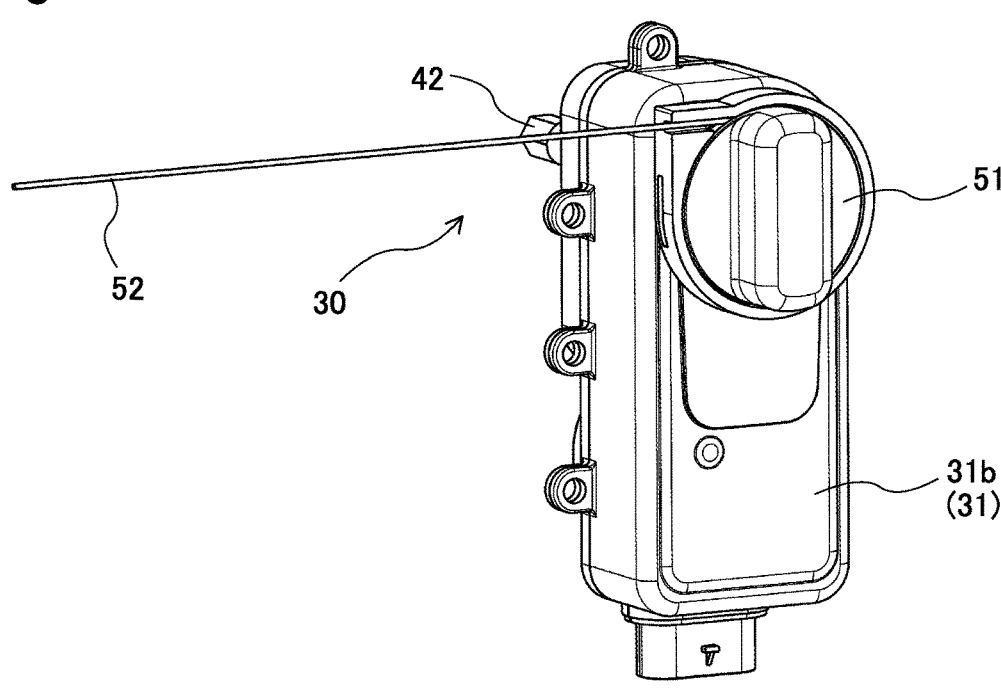
FIG. 3 is a perspective view of a main part of the lid opening/closing structure according to the first embodiment.
Figure 4:
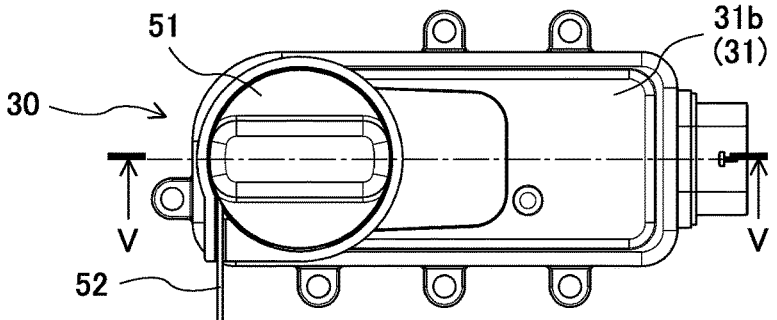
FIG. 4 is a front view of a main part of the lid opening/closing structure according to the first embodiment.
Figure 5:
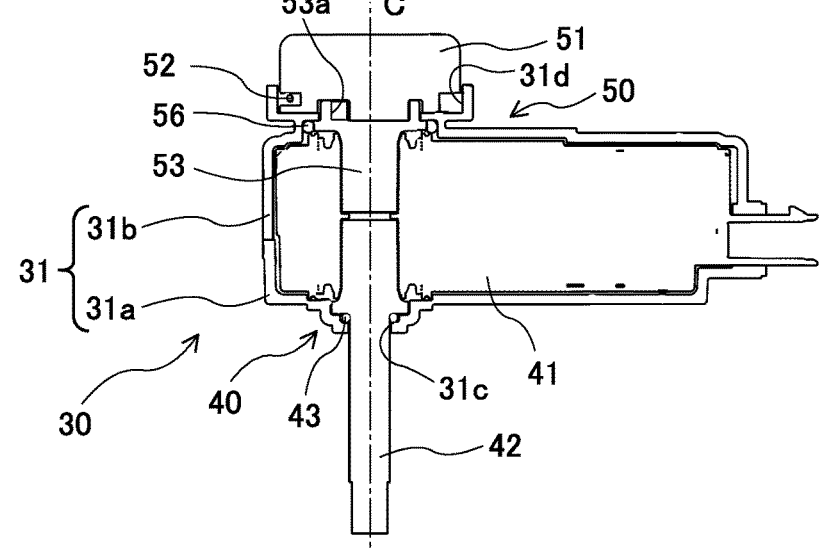
FIG. 5 is a cross-sectional view taken along V-V shown in FIG. 4.
Figure 6:
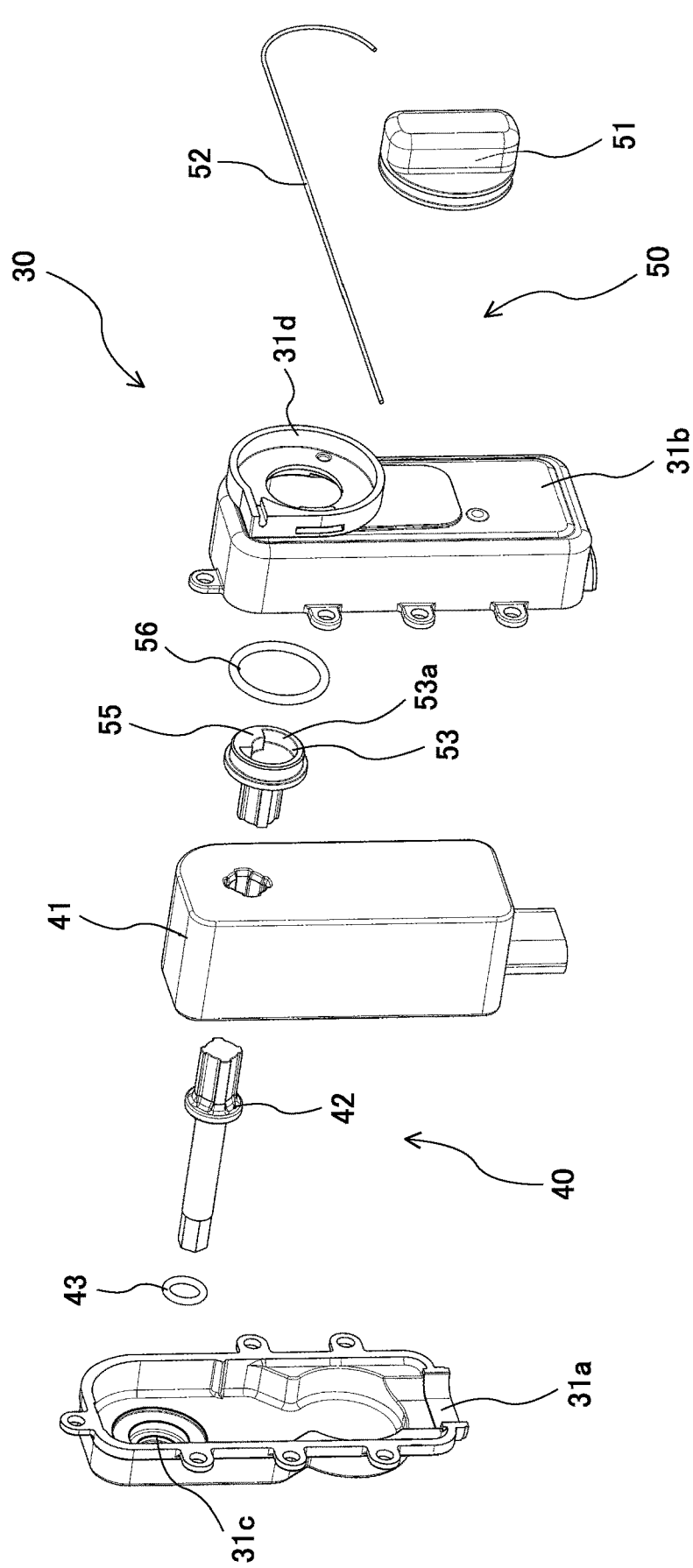
FIG. 6 is an exploded view of a main part of the lid opening/closing structure according to the first embodiment.

A lid opening/closing structure 1 according to a first embodiment is a structure for opening/closing a lid 20 for closing an opening. As shown in FIG. 1 and FIG. 2, the lid opening/closing structure 1 includes a base member 10, the lid 20, and a driving device 30. The lid opening/closing structure 1 is capable of opening/closing the lid 20 between a fully-closed position and a fully-opened position by rotating the lid 20 relative to the base member 10 by means of the driving device 30.

The base member 10 is a member formed in a container shape or a box shape. Specifically, the base member 10 is a tubular bottomed member having a bottom wall 11 formed on one end side (i.e., a far side) and an opening 12 formed on another end side (i.e., a near side). The base member 10 is formed in a square tube shape or a circular tube shape. The base member 10 is attached, for example, to a mounting hole provided in a vehicle body-side wall or a hood of a vehicle. For example, a charging port, a fuel port, or the like of the vehicle is provided at the mounting hole. The base member 10 is an injection-molded article molded from a resin or the like.

The bottom wall 11 of the base member 10 is provided with an outlet 13 having a predetermined shape. The outlet 13 communicates with the above fuel port or charging port. One end of a pipe or cable connected to a fuel tank, a battery, or the like is exposed at the outlet 13. Whereas the one end of the pipe or cable is hidden inside the opening of the base member 10 at a closed position including the fully-closed position of the lid 20, the one end of the pipe or cable is exposed to the outside such that fuel supply or charging is enabled at an opened position including the fully-opened position of the lid 20.

The lid 20 is a plate-shaped member for closing the opening 12 of the base member 10. The lid 20 is rotatably supported by the base member 10. The lid 20 is rotatable in an up-down direction relative to the base member 10 about a horizontally extending axis. The lid 20 is capable of closing the opening 12 and also opening the opening 12, and is opened/closed between the fully-closed position and the fully-opened position. The lid 20 is, for example, an injection-molded article molded from a resin or the like.

The driving device 30 is a device for applying power for opening/closing the lid 20 with respect to the base member

10, to the lid 20 to open/close the lid 20. As shown in FIG. 3, FIG. 4, FIG. 5, and FIG. 6, the driving device 30 has two power-applying mechanisms 40 and 50 which each generate power. Hereinafter, the power-applying mechanism 40 is referred to as first power-applying mechanism 40, and the power-applying mechanism 50 is referred to as second power-applying mechanism 50. In addition, the power applied by the first power-applying mechanism 40 is referred to as first power, and the power applied by the second power-applying mechanism 50 is referred to as second power.

The first power-applying mechanism 40 has an electric actuator 41 and a rotation shaft 42. The electric actuator 41 is a rotatable electric motor that generates the first power. The electric actuator 41 is capable of rotating in both forward and reverse directions. When a switch opening operation is performed by an operator, the electric actuator 41 is rotationally driven in the forward direction in accordance with an opening command from a controller. In addition, when a switch closing operation is performed by the operator, the electric actuator 41 is rotationally driven in the reverse direction in accordance with a closing command from the controller.

The electric actuator 41 is housed in a box member 31 of the driving device 30. The box member 31 is composed of a lower box 31*a* and an upper box 31*b*. The electric actuator 41 is covered with the lower box 31*a* and the upper box 31*b*, and is housed in the box member 31 by fastening together the lower box 31*a* and the upper box 31*b*.

The rotation shaft 42 is a rotatable shaft member that applies the generated first power of the electric actuator 41, to the lid 20. The rotation shaft 42 is rotatable about an axial center C. The rotation shaft 42 is interposed between the electric actuator 41 and the lid 20. The rotation shaft 42 is axially fitted to the electric actuator 41 at one axial end thereof, and rotates together as the electric actuator 41 rotates.

The other axial end of the rotation shaft 42 projects axially outward from a through hole 31*c* of the lower box 31*a* of the box member 31. The periphery of the through hole 31*c* of the box member 31 is sealed by an O-ring 43. The rotation shaft 42 is fitted to the lid 20 at the other axial end thereof, and applies the generated first power of the electric actuator 41 to the lid 20 by rotation thereof. When the generated first power of the electric actuator 41 is applied to the lid 20, the lid 20 is opened/closed by the first power.

The second power-applying mechanism 50 has an emergency operation member 51, a wire 52, and a transmission member 53. The emergency operation member 51 is an operation member that is operated by an external force. The emergency operation member 51 is a rotatable disk-shaped arm member. A groove is formed at the outer edge of the emergency operation member 51 so as to be opened radially outward. The emergency operation member 51 is rotatably housed in a housing portion 31*d* provided to the upper box 31*b*. The emergency operation member 51 is rotatable about the axial center C on the same axis as the rotation shaft 42. The emergency operation member 51 has a shaft body 51*a* provided at the rotation center thereof and extending in the axial direction.

The wire 52 is an external force applying part that applies an external force to the emergency operation member 51. The wire 52 is wound along the groove at the outer edge of the emergency operation member 51. One end of the wire 52 is attached and fixed at a predetermined position on the outer periphery of the emergency operation member 51, and another end of the wire 52 is coupled to an operation part (not shown) such as a lever that is pulled and operated by the operator. When the wire 52 is pulled and operated by an external force by the operator, the wire 52 is pulled in a tangential direction at an outer end portion of the emergency operation member 51, and the external force is applied to the emergency operation member 51 as a force for rotating the emergency operation member 51, whereby the emergency operation member 51 is rotationally operated about the axial center C.

The transmission member 53 is a shaft member that transmits the external force by the rotational operation of the emergency operation member 51, as the second power different from the first power, to the lid 20 via the rotation shaft 42. The transmission member 53 is rotatable about the axial center C on the same axis as the rotation shaft 42 and the shaft body 51*a* of the emergency operation member 51. A shaft portion of the transmission member 53 is inserted into the box member 31 through a through hole of the upper box 31*b* of the box member 31. The periphery of the through hole of the box member 31 is sealed by an O-ring 56. The transmission member 53 is axially fitted to the electric actuator 41 at one axial end thereof, and is coupled to the rotation shaft 42. The transmission member 53 rotates together as the electric actuator 41 and the emergency operation member 51 rotate. The transmission member 53 has a shaft hole 53*a* provided at the rotation center thereof and extending in the axial direction. The shaft body 51*a* of the emergency operation member 51 is inserted into the shaft hole 53*a*.

The second power-applying mechanism 50 also has an engagement portion 54 and a to-be-engaged portion 55 capable of being engaged with the engagement portion 54. The engagement portion 54 is provided to the emergency operation member 51. The to-be-engaged portion 55 is provided to the transmission member 53. The emergency operation member 51 and the transmission member 53 are formed such that the engagement portion 54 and the to-be-engaged portion 55 are engaged with each other only at a predetermined timing and are not engaged with each other at other timings.

That is, the engagement portion 54 and the to-be-engaged portion 55 are not engaged with each other when the lid 20 is opened/closed between the fully-closed position and the fully-opened position by the first power by the electric actuator 41, that is, when the rotation shaft 42 is rotated by the first power. On the other hand, when the emergency operation member 51 is rotationally operated by the external force from the wire 52, the engagement portion 54 and the to-be-engaged portion 55 are engaged with each other such that the lid 20 is opened/closed by applying the second power by the external force to the lid 20 via the electric actuator 41, that is, the rotation shaft 42 is rotated by the second power.

The engagement portion 54 is formed on the shaft body 51*a* of the emergency operation member 51. The engagement portion 54 is formed in a bulge shape so as to project radially outward from the outer surface of the shaft body 51*a*. The engagement portion 54 is provided only in a partial angular range (e.g., 150°) of the entire circumferential range of the shaft body 51*a*. The engagement portion 54 may be provided so as to project over the entirety of the partial angular range of the entire circumferential range, but only needs to be provided so as to project at least at both ends of the partial angular range.

The to-be-engaged portion 55 is formed in the shaft hole 53*a* of the transmission member 53. The to-be-engaged portion 55 is formed in a bulge shape so as to project from the inner surface of a wall that forms the shaft hole 53*a*, toward the axial center C. The to-be-engaged portion 55 is provided only in a partial angular range (e.g., 90°) of the entire circumferential range of the shaft hole 53*a*. The total value of the angular range of the engagement portion 54 and the angular range of the to-be-engaged portion 55 is set to be less than 360°. The to-be-engaged portion 55 may be provided so as to project over the entirety of the partial angular range of the entire circumferential range, but only needs to be provided so as to project at least at both ends of the partial angular range.

The engagement portion 54 and the to-be-engaged portion 55 are each formed such that the circumferentially oriented side surfaces of the bulge-shaped portion thereof face in the circumferential direction. The engagement portion 54 and the to-be-engaged portion 55 are brought into engagement with each other by the side surfaces thereof coming into contact with each other.

The emergency operation member 51 and the transmission member 53 are formed such that in a state where the shaft body 51*a* of the emergency operation member 51 is inserted into the shaft hole 53*a* of the transmission member 53, the emergency operation member 51 and the transmission member 53 have an idle section where the engagement portion 54 and the to-be-engaged portion 55 are rotatable relative to each other by not being engaged with each other, and a synchronous section where the engagement portion 54 and the to-be-engaged portion 55 are integrally rotatable by being engaged with each other. The idle section is set such that in a process in which the lid 20 is opened from the fully-closed position to the fully-opened position by the first power by the electric actuator 41, the engagement portion 54 of the emergency operation member 51 and the to-be-engaged portion 55 of the transmission member 53 are not engaged with each other. In addition, the synchronous section is set such that in a process in which the lid 20 is opened from the fully-closed position to the fully-opened position by the second power by the emergency operation member 51, the engagement portion 54 and the to-be-engaged portion 55 are engaged with each other.

Next, the operation of the lid opening/closing structure 1 will be described with reference to FIG. 7.

In the lid opening/closing structure 1, when the electric actuator 41 is not rotationally driven and the wire 52 is not pulled and operated, the lid 20 is locked into an opening/closing stop state by frictional force or the like. At the fully-closed position of the lid 20, the engagement portion 54 of the emergency operation member 51 and the to-be-engaged portion 55 of the transmission member 53 are maintained in a positional relationship as shown in FIG. 7.

When the switch opening operation is performed by the operator at the fully-closed position of the lid 20, the electric actuator 41 generates the first power for opening the lid 20. When the first power is generated by the electric actuator 41, the rotation shaft 42 rotates together as the electric actuator 41 rotates, whereby the first power is applied to the lid 20 via the rotation shaft 42. When the first power is applied to the lid 20, the lid 20 is opened by the first power. The opening motion of the lid 20 is continued until reaching the fully-opened position.

Also, when the electric actuator 41 generates the first power as described above, the transmission member 53 rotates together (in the left rotation direction in FIG. 7) as the electric actuator 41 rotates. In this case, the transmission member 53 is rotated such that a state where the engagement portion 54 and the to-be-engaged portion 55 are not engaged with each other continues in a process in which the lid 20 is automatically opened from the fully-closed position to the fully-opened position by the first power.

Furthermore, when the switch closing operation is performed by the operator at the fully-opened position of the lid 20, similarly, the lid 20 is closed to the fully-closed position by the first power of the electric actuator 41, and the transmission member 53 is rotated such that in this process, a state where the engagement portion 54 and the to-be-engaged portion 55 are not engaged with each other continues.

Therefore, when the lid 20 is automatically opened/closed between the fully-closed position and the fully-opened position by the first power by the electric actuator 41, the engagement portion 54 of the emergency operation member 51 and the to-be-engaged portion 55 of the transmission member 53 are not engaged with each other, whereby a force for rotating the emergency operation member 51 is not applied to the emergency operation member 51 by the rotation of the transmission member 53.

Figure 7:
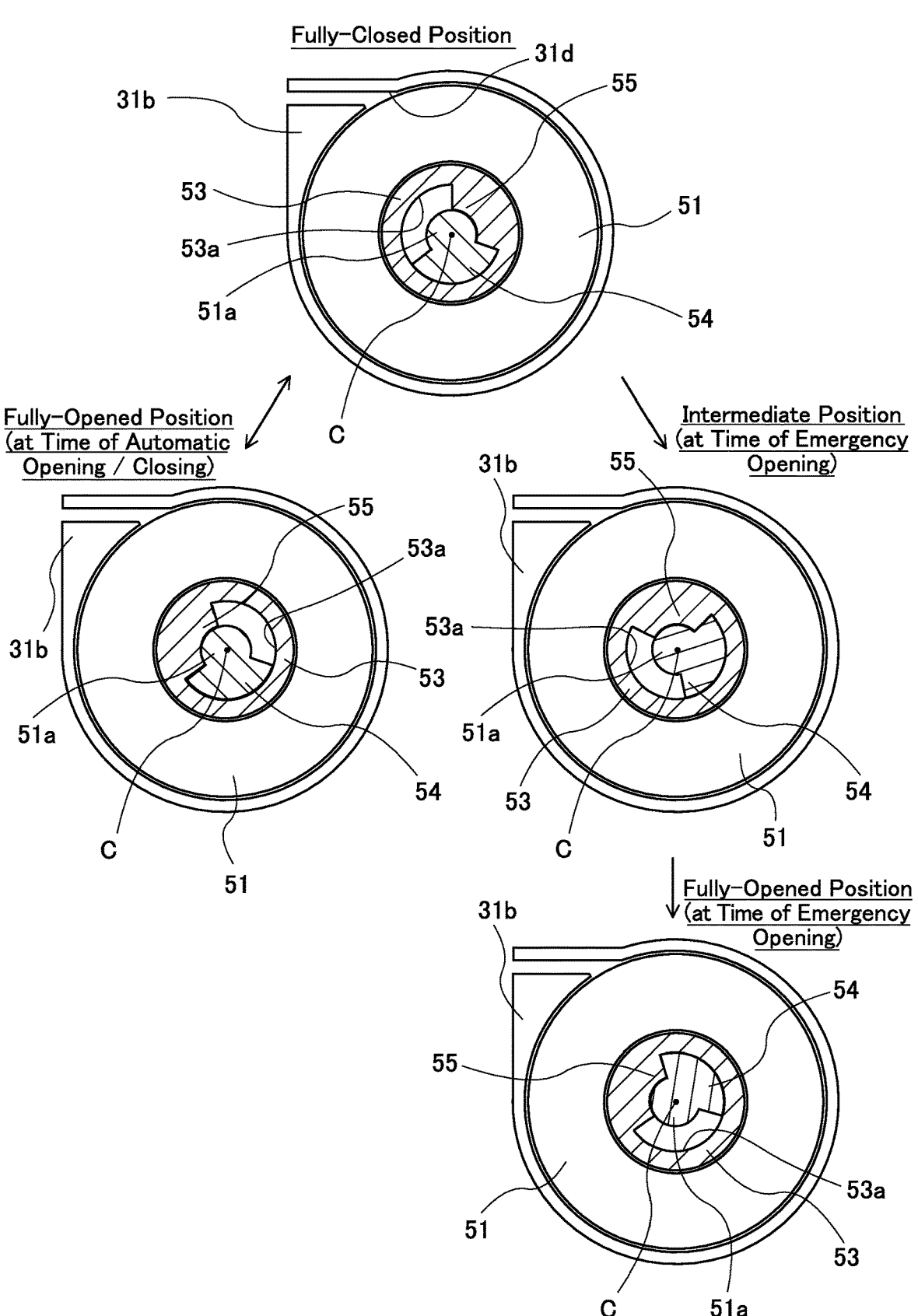
FIG. 7 illustrates a positional relationship of a main part during opening/closing operation of the lid opening/closing structure according to the first embodiment.
Figure 8:
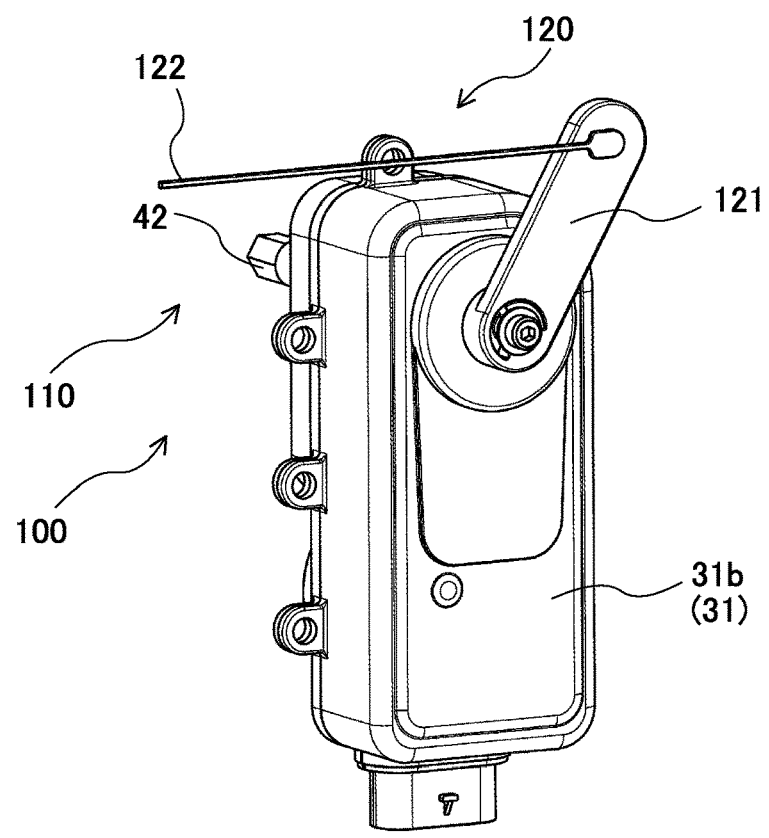
FIG. 8 is a perspective view of a main part of a lid opening/closing structure according to a second embodiment.
Figure 9:
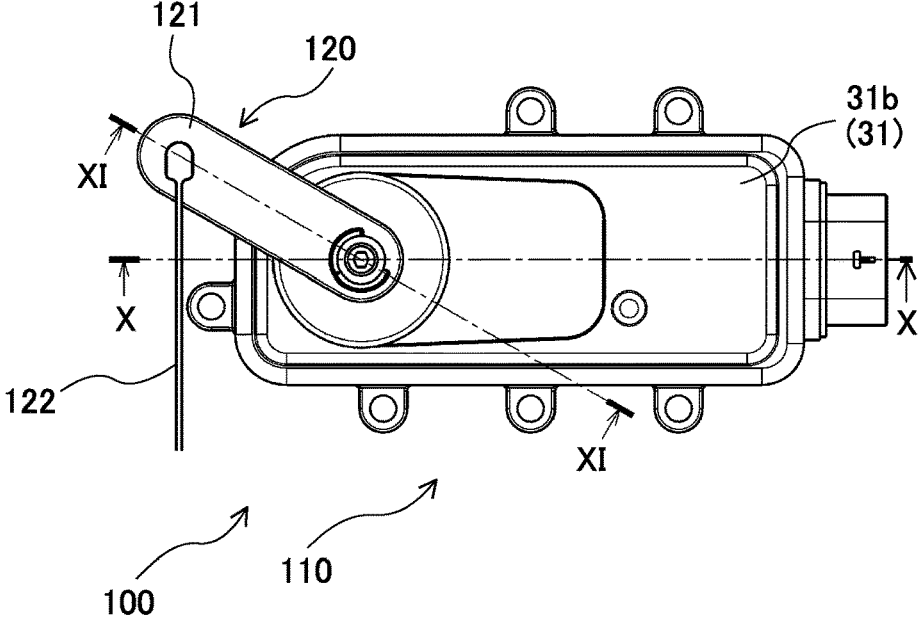
FIG. 9 is a front view of a main part of the lid opening/closing structure according to the second embodiment.
Figure 10:
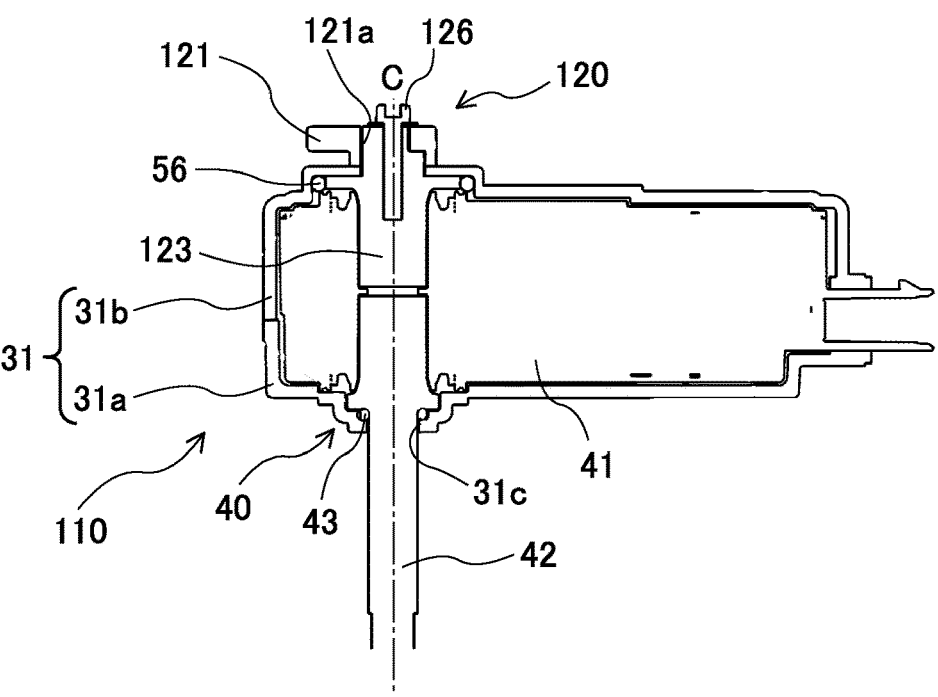
FIG. 10 is a cross-sectional view taken along X-X shown in FIG. 9.
Figure 11:
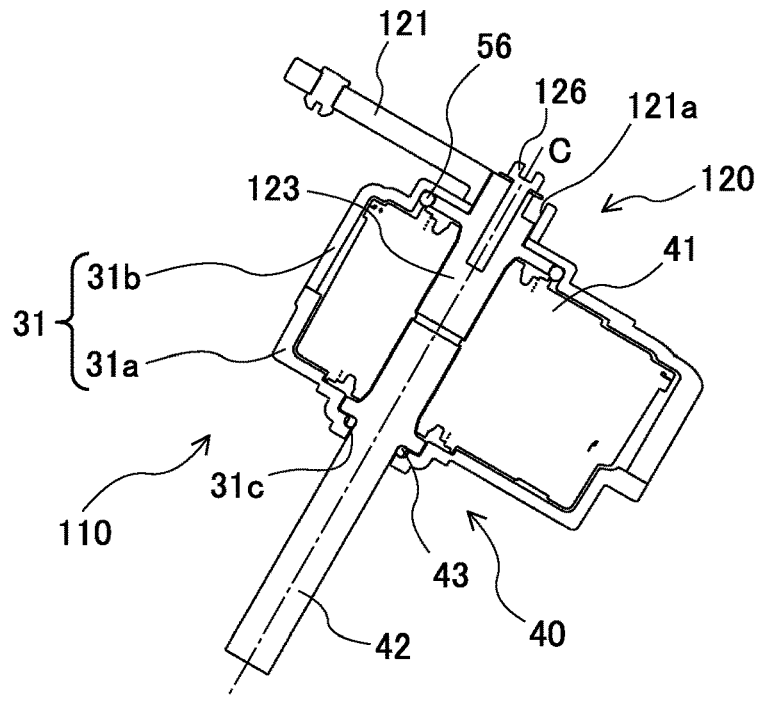
FIG. 11 is a cross-sectional view taken along XI-XI shown in FIG. 9.
Figure 12:
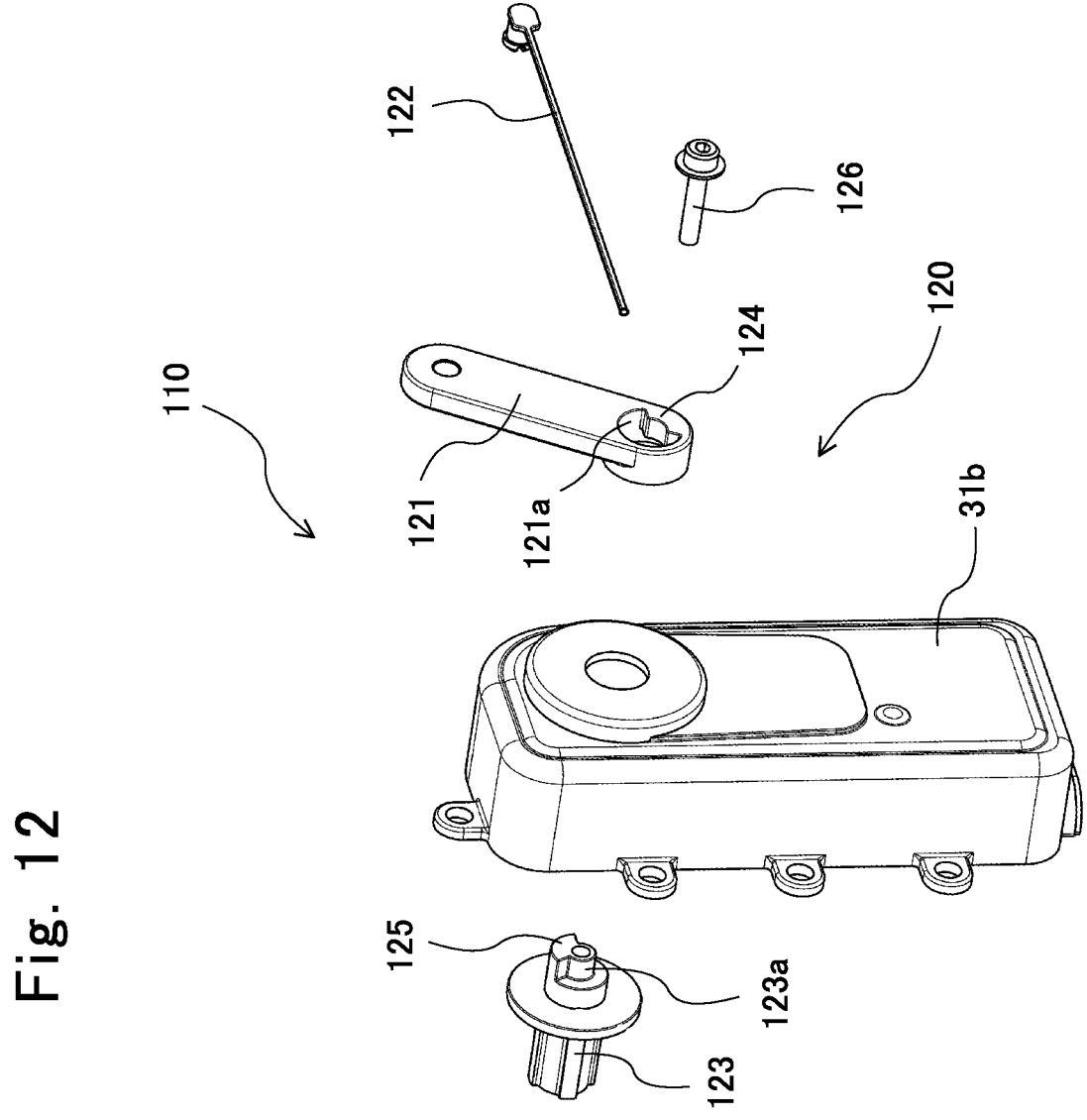
FIG. 12 is an exploded view of a main part of the lid opening/closing structure according to the second embodiment.

On the other hand, when the wire 52 is pulled and operated by an external force by the operator at the fully-closed position of the lid 20, the emergency operation member 51 is rotationally operated (in the left rotation direction in FIG. 7). When the emergency operation member 51 is rotationally operated, the engagement portion 54 of the emergency operation member 51 and the to-be-engaged portion 55 of the transmission member 53 are brought into engagement with each other, whereby the transmission member 53 rotates together as the emergency operation member 51 rotates. The rotation of the transmission member 53 is continued until the lid 20 reaches the fully-opened position. When the transmission member 53 rotates together as the emergency operation member 51 rotates, the external force by the operator is applied as the second power to the lid 20 via the electric actuator 41 and the rotation shaft 42. When the second power is applied to the lid 20, the lid 20 is opened to the fully-opened position by the second power.

Therefore, when the wire 52 is pulled and operated by an external force by the operator at the fully-closed position of the lid 20, the engagement portion 54 of the emergency operation member 51 and the to-be-engaged portion 55 of the transmission member 53 are brought into engagement with each other, whereby the external force is applied, as the second power for opening the lid 20, from the emergency operation member 51 to the lid 20 via the transmission member 53→the electric actuator 41→the rotation shaft 42. In this case, the lid 20 is opened from the fully-closed position to the fully-opened position by the second power by the emergency operation member 51.

As described above, when no failure has occurred in the electric actuator 41, the lid 20 is opened/closed by the first power generated by the electric actuator 41. In addition, when a failure occurs in the electric actuator 41, the lid 20 is opened/closed by the second power generated by the external force operation on the wire 52 and further on the emergency operation member 51. Therefore, even in an emergency in which a failure occurs in the electric actuator 41, the opening/closing of the lid 20 is ensured, thereby allowing fuel supply and charging.

Moreover, at the time of automatic lid opening/closing when no failure has occurred in the electric actuator 41, in a process in which the lid 20 is opened/closed between the fully-closed position and the fully-opened position by the first power, the engagement portion 54 and the to-be-engaged portion 55 are not engaged with each other, so that the emergency operation member 51 does not rotate and the wire 52 is not operated. Therefore, loosening of the wire 52, etc., due to the automatic lid opening/closing is avoided. Accordingly, deterioration of the wire 52 is suppressed, and the necessity to provide a space for suppressing interference with other components due to loosening of the wire 52 is eliminated, thereby reducing the size of the driving device 30.

Second Embodiment

A lid opening/closing structure 100 according to a second embodiment is realized by using a driving device 110 instead of the driving device 30 in the lid opening/closing structure 1 according to the first embodiment. In the lid opening/closing structure 100, the same components as those in the lid opening/closing structure 1 according to the first embodiment are designated by the same reference characters, and the description thereof is omitted or simplified.

The driving device 110 is realized by using a second power-applying mechanism 120 instead of the second power-applying mechanism 50 in the driving device 30 of the first embodiment. That is, as shown in FIG. 8, FIG. 9, FIG. 10, FIG. 11, and FIG. 12, the driving device 110 has the second power-applying mechanism 120 which generates power.

The second power-applying mechanism 120 has an emergency operation member 121, a wire 122, and a transmission member 123. The emergency operation member 121 is an operation member that is operated by an external force. The emergency operation member 121 is a rotatable lever-like arm member extending in the radial direction. The emergency operation member 121 is rotatably supported by the transmission member 123 via a screw 126. The emergency operation member 121 is rotatable about the axial center C on the same axis as the rotation shaft 42. The emergency operation member 121 has a shaft hole 121*a* provided at the rotation center thereof and extending in the axial direction.

The wire 122 is an external force applying part that applies an external force to the emergency operation member 121. One end of the wire 122 is supported by a radially outer end portion of the emergency operation member 121 so as to be rotatable relative thereto. Another end of the wire 122 is coupled to an operation part (not shown) such as a lever that is pulled and operated by the operator. When the wire 122 is pulled and operated by an external force by the operator, the wire 122 is pulled in a tangential direction at an outer end portion of the emergency operation member 121, and the external force is applied to the emergency operation member 121 as a force for rotating the emergency operation member 121, whereby the emergency operation member 121 is rotationally operated about the axial center C.

The transmission member 123 is a shaft member that transmits the external force by the rotational operation of the emergency operation member 121, as the second power different from the first power, to the lid 20 via the rotation shaft 42. The transmission member 123 is rotatable about the axial center C on the same axis as the rotation shaft 42 and a shaft portion of the emergency operation member 121. A shaft portion of the transmission member 123 is inserted into the box member 31 through the through hole of the upper box 31*b* of the box member 31. The transmission member 123 is axially fitted to the electric actuator 41 at one axial end thereof, and is coupled to the rotation shaft 42. The transmission member 123 rotates together as the electric actuator 41 and the emergency operation member 121 rotate. The transmission member 123 has a shaft body 123*a* provided at the rotation center thereof and extending in the axial direction. The shaft body 123*a* is inserted into the shaft hole 121*a* of the emergency operation member 121.

The second power-applying mechanism 120 also has an engagement portion 124 and a to-be-engaged portion 125 capable of being engaged with the engagement portion 124. The engagement portion 124 is provided to the emergency operation member 121. The to-be-engaged portion 125 is provided to the transmission member 123. The emergency operation member 121 and the transmission member 123 are formed such that the engagement portion 124 and the to-be-engaged portion 125 are engaged with each other only at a predetermined timing and are not engaged with each other at other timings.

That is, the engagement portion 124 and the to-be-engaged portion 125 are not engaged with each other when the lid 20 is opened/closed between the fully-closed position and the fully-opened position by the first power by the electric actuator 41, that is, when the rotation shaft 42 is rotated by the first power. On the other hand, when the emergency operation member 121 is rotationally operated by the external force from the wire 122, the engagement portion 124 and the to-be-engaged portion 125 are engaged with each other such that the lid 20 is opened/closed by applying the second power by the external force to the lid 20 via the electric actuator 41, that is, the rotation shaft 42 is rotated by the second power.

The engagement portion 124 is formed in the shaft hole 121*a* of the emergency operation member 121. The engagement portion 124 is formed in a bulge shape so as to project from the inner surface of a wall that forms the shaft hole 121*a*, toward the axial center C. The engagement portion 124 is provided only in a partial angular range (e.g., 90°) of the entire circumferential range of the shaft hole 121*a*. The engagement portion 124 may be provided so as to project over the entirety of the partial angular range of the entire circumferential range, but only needs to be provided so as to project at least at both ends of the partial angular range.

The to-be-engaged portion 125 is formed on the shaft body 123*a* of the transmission member 123. The to-be-engaged portion 125 is formed in a bulge shape so as to project radially outward from the outer surface of the shaft body 123*a*. The to-be-engaged portion 125 is provided only in a partial angular range (e.g., 150°) of the entire circumferential range of the shaft body 123*a*. The total value of the angular range of the engagement portion 124 and the angular range of the to-be-engaged portion 125 is set to be less than 360°. The to-be-engaged portion 125 may be provided so as to project over the entirety of the partial angular range of the entire circumferential range, but only needs to be provided so as to project at least at both ends of the partial angular range.

The engagement portion 124 and the to-be-engaged portion 125 are each formed such that the circumferentially oriented side surfaces of the bulge-shaped portion thereof face in the circumferential direction. The engagement portion 124 and the to-be-engaged portion 125 are brought into engagement with each other by the side surfaces thereof coming into contact with each other.

The emergency operation member 121 and the transmission member 123 are formed such that in a state where the shaft body 123*a* of the transmission member 123 is inserted into the shaft hole 121*a* of the emergency operation member 121, the emergency operation member 121 and the transmission member 123 have an idle section where the engagement portion 124 and the to-be-engaged portion 125 are rotatable relative to each other by not being engaged with each other, and a synchronous section where the engagement portion 124 and the to-be-engaged portion 125 are integrally rotatable by being engaged with each other. The idle section is set such that in a process in which the lid 20 is opened from the fully-closed position to the fully-opened position by the first power by the electric actuator 41, the engagement portion 124 of the emergency operation member 121 and the to-be-engaged portion 125 of the transmission member 123 are not engaged with each other. In addition, the synchronous section is set such that in a process in which the lid 20 is opened from the fully-closed position to the fully-opened position by the second power by the emergency operation member 121, the engagement portion 124 and the to-be-engaged portion 125 are engaged with each other.

Next, the operation of the lid opening/closing structure 100 will be described.

In the lid opening/closing structure 100, when the lid 20 is automatically opened/closed between the fully-closed position and the fully-opened position by the first power by the electric actuator 41, the engagement portion 124 of the emergency operation member 121 and the to-be-engaged portion 125 of the transmission member 123 are not engaged with each other, whereby a force for rotating the emergency operation member 121 is not applied to the emergency operation member 121 by the rotation of the transmission member 123.

On the other hand, when the wire 122 is pulled and operated by an external force by the operator at the fully-closed position of the lid 20, the emergency operation member 121 is rotationally operated. When the emergency operation member 121 is rotationally operated, the engagement portion 124 of the emergency operation member 121 and the to-be-engaged portion 125 of the transmission member 123 are brought into engagement with each other, whereby the transmission member 123 rotates together as the emergency operation member 121 rotates. The rotation of the transmission member 123 is continued until the lid 20 reaches the fully-opened position. When the transmission member 123 rotates together as the emergency operation member 121 rotates, the external force by the operator is applied as the second power to the lid 20 via the electric actuator 41 and the rotation shaft 42. When the second power is applied to the lid 20, the lid 20 is opened to the fully-opened position by the second power.

Therefore, when the wire 122 is pulled and operated by an external force by the operator at the fully-closed position of the lid 20, the engagement portion 124 of the emergency operation member 121 and the to-be-engaged portion 125 of the transmission member 123 are brought into engagement with each other, whereby the external force is applied, as the second power for opening the lid 20, from the emergency operation member 121 to the lid 20 via the transmission member 123→the electric actuator 41→the rotation shaft 42. In this case, the lid 20 is opened from the fully-closed position to the fully-opened position by the second power by the emergency operation member 121.

As described above, in the lid opening/closing structure 100 as well, when a failure occurs in the electric actuator 41, the lid 20 is opened/closed by the second power generated by the external force operation on the wire 122 and further on the emergency operation member 121. Therefore, even in an emergency in which a failure occurs in the electric actuator 41, the opening/closing of the lid 20 is ensured, thereby allowing fuel supply and charging.

Moreover, at the time of automatic lid opening/closing when no failure has occurred in the electric actuator 41, in a process in which the lid 20 is opened/closed between the fully-closed position and the fully-opened position by the first power, the engagement portion 124 and the to-be-engaged portion 125 are not engaged with each other, so that the emergency operation member 121 does not rotate and the wire 122 is not operated. Therefore, loosening of the wire 122, etc., due to the automatic lid opening/closing is avoided. Accordingly, deterioration of the wire 122 is suppressed, and the necessity to provide a space for suppressing interference with other components due to loosening of the wire 122 is eliminated, thereby reducing the size of the driving device 110.

Third Embodiment

A lid opening/closing structure 200 according to a third embodiment is realized by using a driving device 210 instead of the driving device 30 in the lid opening/closing structure 1 according to the first embodiment. In the lid opening/closing structure 200, the same components as those in the lid opening/closing structure 1 according to the first embodiment are designated by the same reference characters, and the description thereof is omitted or simplified.

Figure 13:
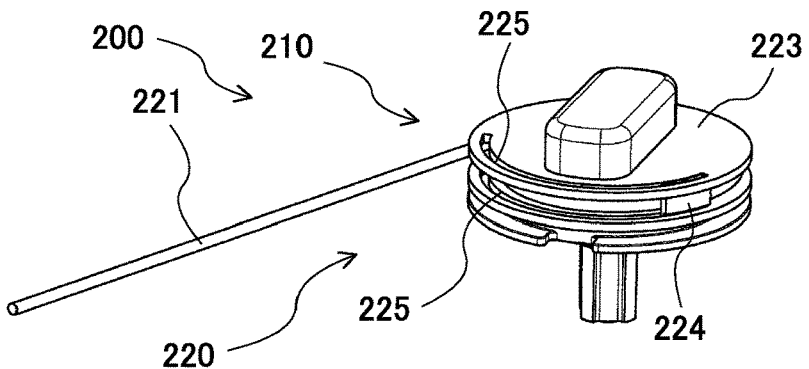
FIG. 13 is a perspective view of a main part of a lid opening/closing structure according to a third embodiment.
Figure 14:
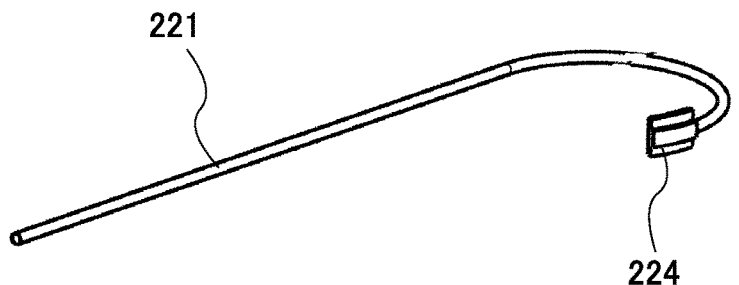
FIG. 14 is a perspective view of a wire used in the lid opening/closing structure according to the third embodiment.
Figure 15:
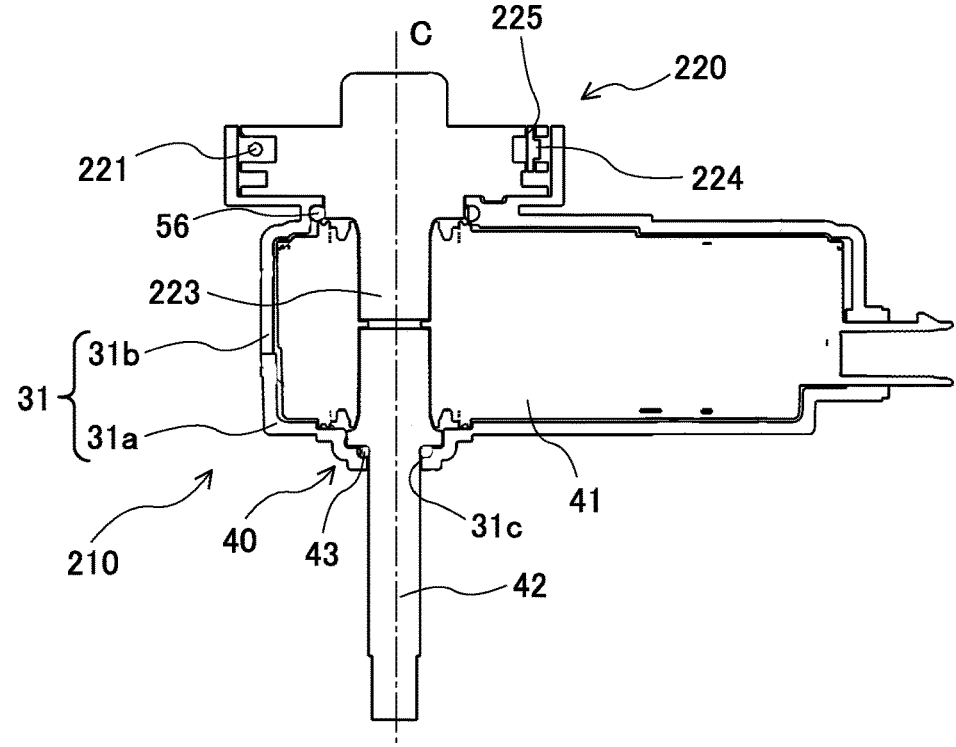
FIG. 15 is a cross-sectional view of a main part of the lid opening/closing structure according to the third embodiment.

The driving device 210 is realized by using a second power-applying mechanism 220 instead of the second power-applying mechanism 50 in the driving device 30 of the first embodiment. That is, as shown in FIG. 13, FIG. 14, and FIG. 15, the driving device 210 has the second power-applying mechanism 220 which generates power.

The second power-applying mechanism 220 has an emergency operation member 221 and a transmission member 223. The emergency operation member 221 is an operation member that is operated by an external force. The emergency operation member 221 is a wire that is pulled and operated by the operator via an operation part (not shown) such as a lever.

The transmission member 223 is a disk member that transmits the external force by the pulling operation of the emergency operation member 221 as second power to the lid 20 via the rotation shaft 42. A groove is formed at the outer edge of the transmission member 223 so as to be opened radially outward. The emergency operation member 221 is wound so as to be fitted along the groove at the outer edge of the transmission member 223. The transmission member 223 is rotatable about the axial center C on the same axis as the rotation shaft 42. A shaft portion of the transmission member 223 is inserted into the box member 31 through the through hole of the upper box 31b of the box member 31. The transmission member 223 is axially fitted to the electric actuator 41 at one axial end thereof, and is coupled to the rotation shaft 42. The transmission member 223 rotates together as the electric actuator 41 rotates, and also rotates as the emergency operation member 221 moves.

The second power-applying mechanism 220 also has an engagement portion 224 and a to-be-engaged portion 225 capable of being engaged with the engagement portion 224. The engagement portion 224 is provided to the emergency operation member 221. The to-be-engaged portion 225 is provided to the transmission member 223. The emergency operation member 221 and the transmission member 223 are formed such that the engagement portion 224 and the to-be-engaged portion 225 are engaged with each other only at a predetermined timing and are not engaged with each other at other timings.

That is, the engagement portion 224 and the to-be-engaged portion 225 are not engaged with each other when the lid 20 is opened/closed between the fully-closed position and the fully-opened position by the first power by the electric actuator 41, that is, when the rotation shaft 42 is rotated by the first power. On the other hand, when the emergency operation member 221 is pulled and operated by an external force, the engagement portion 224 and the to-be-engaged portion 225 are engaged with each other such that the lid 20 is opened/closed by applying the second power by the external force to the lid 20 via the electric actuator 41, that is, the rotation shaft 42 is rotated by the second power.

The engagement portion 224 has a plate shape formed wider than a body portion of the emergency operation member 221. The engagement portion 224 is provided at one end of the emergency operation member 221. The to-be-engaged portion 225 is a hole into which the engagement portion 224 is fitted so as to be movable in the circumferential direction. The to-be-engaged portion 225 is provided in each of both axial end surfaces of the transmission member 223 between which the groove at the outer edge, into which the emergency operation member 221 is fitted, is located. The to-be-engaged portion 225 is formed so as to penetrate in the axial direction near a radially outer end portion and extend in a band shape in the circumferential direction. The to-be-engaged portion 225 is provided only in a partial angular range (e.g., 90°) of the entire circumferential range.

The engagement portion 224 is fitted into each to-be-engaged portion 225 so as to be movable in the circumferential direction. The engagement portion 224 and the to-be-engaged portion 225 are brought into engagement with each other by the engagement portion 224 coming into contact with an inner surface forming a circumferential end of the to-be-engaged portion 225.

The emergency operation member 221 and the transmission member 223 are formed so as to have an idle section where the engagement portion 224 and the to-be-engaged portion 225 are rotatable relative to each other by not being engaged with each other, and a synchronous section where the engagement portion 224 and the to-be-engaged portion 225 are integrally rotatable by being engaged with each other. The idle section is set such that in a process in which the lid 20 is opened from the fully-closed position to the fully-opened position by the first power by the electric actuator 41, the engagement portion 224 of the emergency operation member 221 and the to-be-engaged portion 225 of the transmission member 223 are not engaged with each other. In addition, the synchronous section is set such that in a process in which the lid 20 is opened from the fully-closed position to the fully-opened position by the second power by the emergency operation member 221, the engagement portion 224 and the to-be-engaged portion 225 are engaged with each other.

Figure 16:
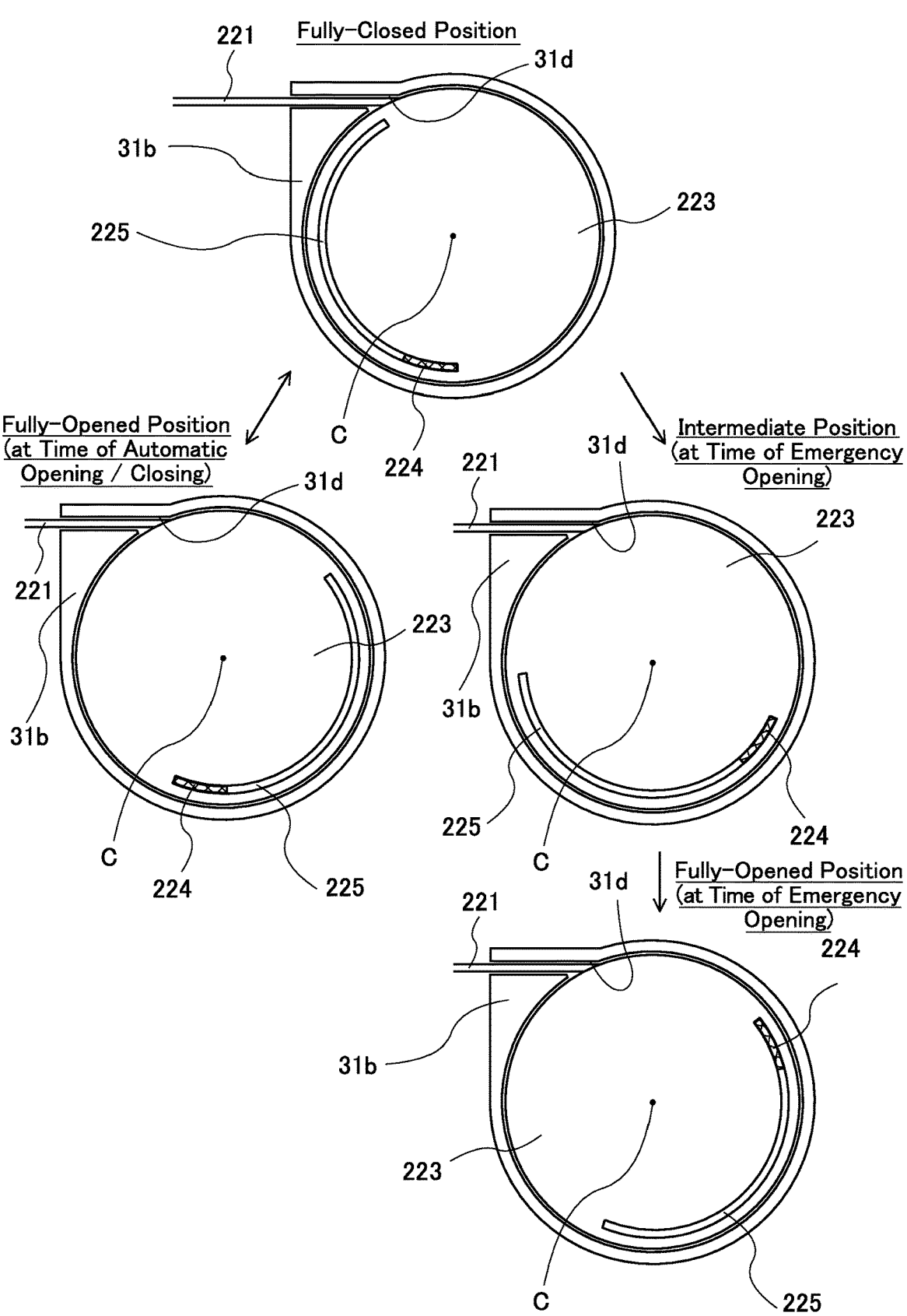
FIG. 16 illustrates a positional relationship of a main part during opening/closing operation of the lid opening/closing structure according to the third embodiment.
Figure 17:
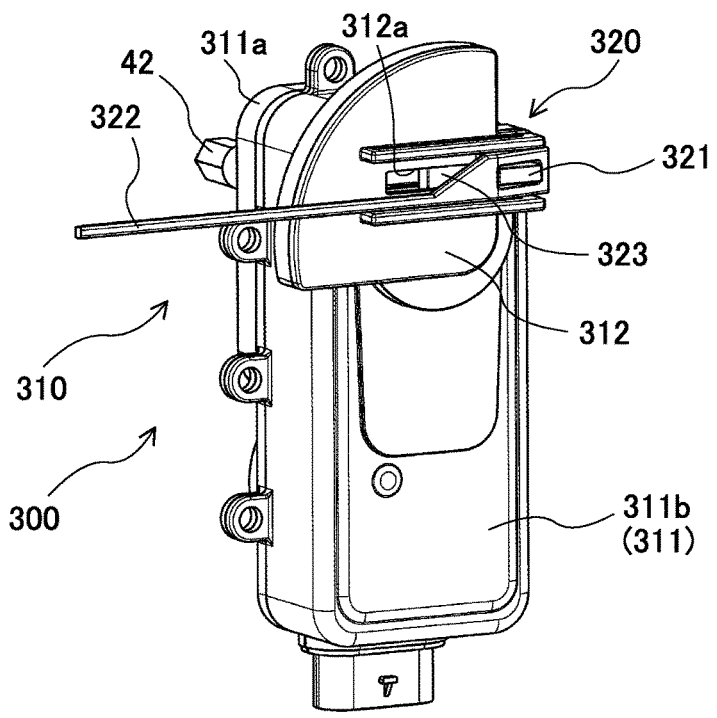
FIG. 17 is a perspective view of a main part of a lid opening/closing structure according to a fourth embodiment.
Figure 18:
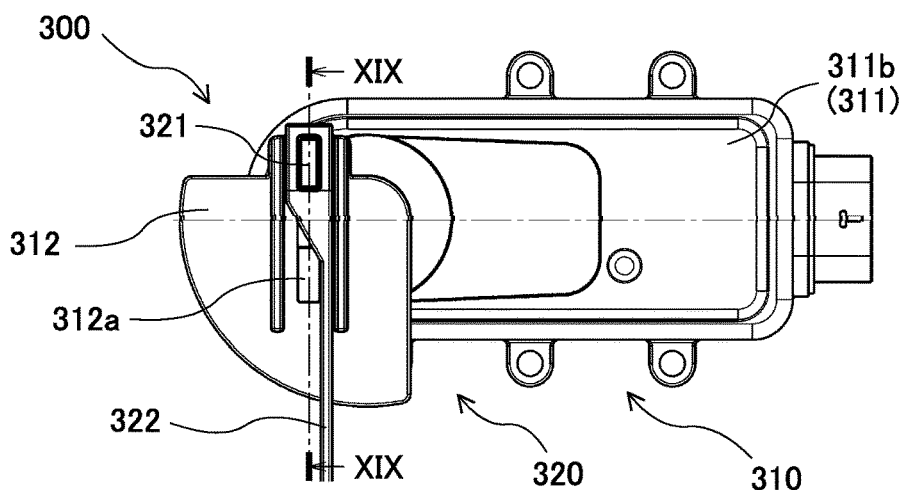
FIG. 18 is a front view of a main part of the lid opening/closing structure according to the fourth embodiment.
Figure 19:
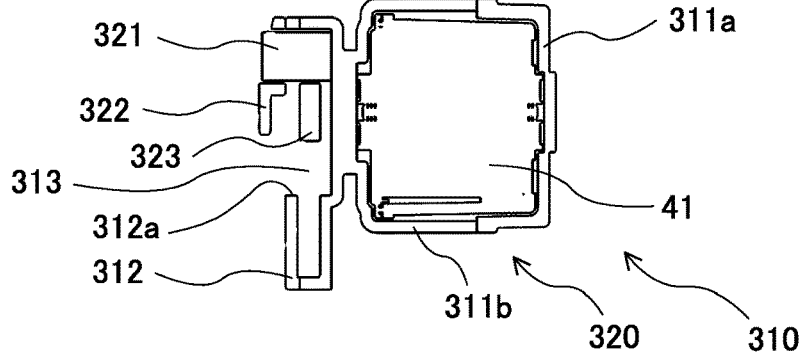
FIG. 19 is a cross-sectional view taken along XIX-XIX shown in FIG. 18.
Figure 20:
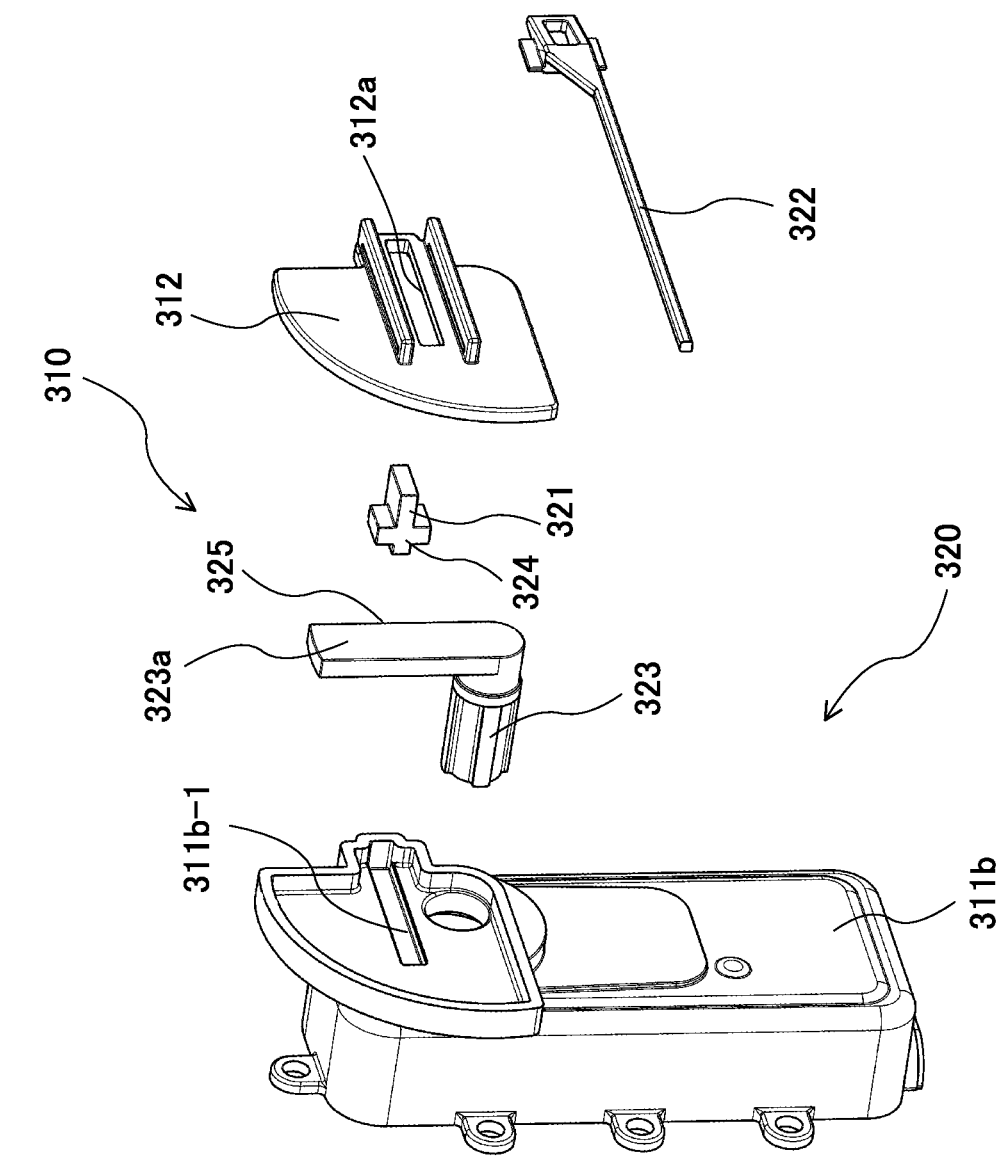
FIG. 20 is an exploded view of a main part of the lid opening/closing structure according to the fourth embodiment.

Next, the operation of the lid opening/closing structure 200 will be described with reference to FIG. 16.

In the lid opening/closing structure 200, when the lid 20 is automatically opened/closed between the fully-closed position and the fully-opened position by the first power by the electric actuator 41, the engagement portion 224 of the emergency operation member 221 and the to-be-engaged portion 225 of the transmission member 223 are not engaged with each other, whereby a force for rotating the emergency operation member 221 is not applied to the emergency operation member 221 by the rotation of the transmission member 223.

On the other hand, when the emergency operation member 221 is pulled and operated by an external force by the operator at the fully-closed position of the lid 20, the engagement portion 224 of the emergency operation member 221 and the to-be-engaged portion 225 of the transmission member 223 are brought into engagement with each other, whereby the transmission member 223 rotates together (in the left rotation direction in FIG. 16) as the emergency operation member 221 rotates. The rotation of the transmission member 223 is continued until the lid 20 reaches the fully-opened position. When the transmission member 223 rotates together as the emergency operation member 221 rotates, the external force by the operator is applied as the second power to the lid 20 via the electric actuator 41 and the rotation shaft 42. When the second power is applied to the lid 20, the lid 20 is opened to the fully-opened position by the second power.

Therefore, when the emergency operation member 221 is pulled and operated by an external force by the operator at the fully-closed position of the lid 20, the engagement portion 224 of the emergency operation member 221 and the to-be-engaged portion 225 of the transmission member 223 are brought into engagement with each other, whereby the external force is applied, as the second power for opening the lid 20, from the emergency operation member 221 to the lid 20 via the transmission member 223→the electric actuator 41→the rotation shaft 42. In this case, the lid 20 is opened from the fully-closed position to the fully-opened position by the second power by the emergency operation member 221.

As described above, in the lid opening/closing structure 200 as well, when a failure occurs in the electric actuator 41, the lid 20 is opened/closed by the second power generated by the external force operation on the emergency operation member 221. Therefore, even in an emergency in which a failure occurs in the electric actuator 41, the opening/closing of the lid 20 is ensured, thereby allowing fuel supply and charging.

Moreover, at the time of automatic lid opening/closing when no failure has occurred in the electric actuator 41, in a process in which the lid 20 is opened/closed between the fully-closed position and the fully-opened position by the first power, the engagement portion 224 and the to-be-engaged portion 225 are not engaged with each other, so that the emergency operation member 221 does not rotate. Therefore, loosening of the emergency operation member 221, etc., due to the automatic lid opening/closing is avoided. Accordingly, deterioration of the emergency operation member 221 is suppressed, and the necessity to provide a space for suppressing interference with other components due to loosening of the emergency operation member 221 is eliminated, thereby reducing the size of the driving device 210.

Fourth Embodiment

A lid opening/closing structure 300 according to a fourth embodiment is realized by using a driving device 310 instead of the driving device 30 in the lid opening/closing structure 1 according to the first embodiment. In the lid opening/closing structure 300, the same components as those in the lid opening/closing structure 1 according to the first embodiment are designated by the same reference characters, and the description thereof is omitted or simplified.

The driving device 310 is realized by using a second power-applying mechanism 320 instead of the second power-applying mechanism 50 in the driving device 30 of the first embodiment. That is, as shown in FIG. 17, FIG. 18, FIG. 19, and FIG. 20, the driving device 310 has the second power-applying mechanism 320 which generates power.

In the present embodiment, the electric actuator 41 is housed in a box member 311 of the driving device 310. The box member 311 is composed of a lower box 311a and an upper box 311b. The electric actuator 41 is covered with the lower box 311a and the upper box 311b, and is housed in the box member 311 by fastening together the lower box 311a and the upper box 311b.

A plate-shaped cover member 312 is attached to the box member 311. The cover member 312 is a member that forms a housing space 313 on the axially outer side of the upper box 311b.

The second power-applying mechanism 320 has an emergency operation member 321, a wire 322, and a transmission member 323. The emergency operation member 321 is an operation member that is operated by an external force. The emergency operation member 321 is a pusher member that is movable in a tangential direction at an outer end portion of the transmission member 323. The emergency operation member 321 is housed in the housing space 313. The emergency operation member 321 is movably fitted into a guide hole 311b-1 formed in an axial end surface of the upper box 311b and a guide hole 312a formed in axial end surface of the cover member 312.

The wire 322 is an external force applying part that applies an external force to the emergency operation member 321. One end of the wire 322 is attached and fixed to a projection portion, of the emergency operation member 321, that projects from the guide hole 312a. The emergency operation member 321 moves along the guide holes 311b-1 and 312a by a pulling operation of the wire 322. Another end of the wire 322 is coupled to an operation part (not shown) such as a lever that is pulled and operated by the operator. When the wire 322 is pulled and operated by an external force by the operator, the wire 322 is pulled in the tangential direction at the outer end portion of the transmission member 323, and the external force is applied to the emergency operation member 321, whereby the emergency operation member 321 is moved and operated in the tangential direction at the outer end portion of the transmission member 323 along the guide holes 311b-1 and 312a.

The transmission member 323 is a shaft member that transmits the external force by the moving operation of the emergency operation member 321, as second power different from the first power, to the lid 20 via the rotation shaft 42. The transmission member 323 is rotatable about the axial center C on the same axis as the rotation shaft 42. A shaft portion of the transmission member 323 is inserted into the box member 311 through the through hole of the upper box 311b of the box member 311. The transmission member 323 is axially fitted to the electric actuator 41 at one axial end thereof, and is coupled to the rotation shaft 42. The transmission member 323 rotates together as the electric actuator 41 rotates, and also rotates as the emergency operation member 321 moves.

The transmission member 323 has a lever portion 323a extending in the radial direction from the axial center C. The lever portion 323a is rotatable about the axial center C together with a body portion of the transmission member 323. The emergency operation member 321 is placed on the back side of the lever portion 323a. The lever portion 323a rotates as the electric actuator 41 rotates as described above, and rotates about the axial center C by being brought into contact with and pressed by the emergency operation member 321 as the emergency operation member 321 moves.

The second power-applying mechanism 320 also has an engagement portion 324 and a to-be-engaged portion 325 capable of being engaged with the engagement portion 324.

The engagement portion 324 is provided to the emergency operation member 321, and is a portion that comes into contact with the lever portion 323*a*. The to-be-engaged portion 325 is provided to the transmission member 323 and is the lever portion 323*a*. The emergency operation member 321 and the transmission member 323 are formed such that the engagement portion 324 and the to-be-engaged portion 325 are engaged with each other only at a predetermined timing and are not engaged with each other at other timings.

That is, the engagement portion 324 and the to-be-engaged portion 325 are not engaged with each other when the lid 20 is opened/closed between the fully-closed position and the fully-opened position by the first power by the electric actuator 41, that is, when the rotation shaft 42 is rotated by the first power. On the other hand, when the emergency operation member 321 is pulled and operated by an external force, the engagement portion 324 and the to-be-engaged portion 325 are engaged with each other such that the lid 20 is opened/closed by applying the second power by the external force to the lid 20 via the electric actuator 41, that is, the rotation shaft 42 is rotated by the second power.

The emergency operation member 321 and the transmission member 323 are formed so as to have an idle section where the engagement portion 324 and the to-be-engaged portion 325 are rotatable relative to each other by not being engaged with each other, and a synchronous section where the engagement portion 324 and the to-be-engaged portion 325 are integrally rotatable by being engaged with each other. The idle section is set such that in a process in which the lid 20 is opened from the fully-closed position to the fully-opened position by the first power by the electric actuator 41, the engagement portion 324 of the emergency operation member 321 and the to-be-engaged portion 325 of the transmission member 323 are not engaged with each other. In addition, the synchronous section is set such that in a process in which the lid 20 is opened from the fully-closed position to the fully-opened position by the second power by the emergency operation member 321, the engagement portion 324 and the to-be-engaged portion 325 are engaged with each other.

Next, the operation of the lid opening/closing structure 300 will be described.

In the lid opening/closing structure 300, when the lid 20 is automatically opened/closed between the fully-closed position and the fully-opened position by the first power by the electric actuator 41, the engagement portion 324 of the emergency operation member 321 and the to-be-engaged portion 325 of the transmission member 323 are not engaged with each other, whereby a force for moving the emergency operation member 321 is not applied to the emergency operation member 321 by the rotation of the transmission member 323.

On the other hand, when the emergency operation member 321 is pulled and operated by an external force by the operator at the fully-closed position of the lid 20, the engagement portion 324 of the emergency operation member 321 and the to-be-engaged portion 325 of the transmission member 323 are brought into engagement with each other, whereby the transmission member 323 rotates as the emergency operation member 321 moves. The rotation of the transmission member 323 is continued until the lid 20 reaches the fully-opened position. When the transmission member 323 rotates as the emergency operation member 321 moves, the external force by the operator is applied as the second power to the lid 20 via the electric actuator 41 and the rotation shaft 42. When the second power is applied to the lid 20, the lid 20 is opened to the fully-opened position by the second power.

Therefore, when the emergency operation member 321 is pulled and operated by an external force by the operator at the fully-closed position of the lid 20, the engagement portion 324 of the emergency operation member 321 and the to-be-engaged portion 325 of the transmission member 323 are brought into engagement with each other, whereby the external force is applied, as the second power for opening the lid 20, from the emergency operation member 321 to the lid 20 via the transmission member 323→the electric actuator 41→the rotation shaft 42. In this case, the lid 20 is opened from the fully-closed position to the fully-opened position by the second power by the emergency operation member 321.

As described above, in the lid opening/closing structure 300 as well, when a failure occurs in the electric actuator 41, the lid 20 is opened/closed by the second power generated by the external force operation on the emergency operation member 321. Therefore, even in an emergency in which a failure occurs in the electric actuator 41, the opening/closing of the lid 20 is ensured, thereby allowing fuel supply and charging.

Moreover, at the time of automatic lid opening/closing when no failure has occurred in the electric actuator 41, in a process in which the lid 20 is opened/closed between the fully-closed position and the fully-opened position by the first power, the engagement portion 324 and the to-be-engaged portion 325 are not engaged with each other, so that the emergency operation member 321 does not move. Therefore, loosening of the emergency operation member 321, etc., due to the automatic lid opening/closing is avoided. Accordingly, deterioration of the emergency operation member 321 is suppressed, and the necessity to provide a space for suppressing interference with other components due to loosening of the emergency operation member 321 is eliminated, thereby reducing the size of the driving device 310.

[Modifications]

Figure 21:
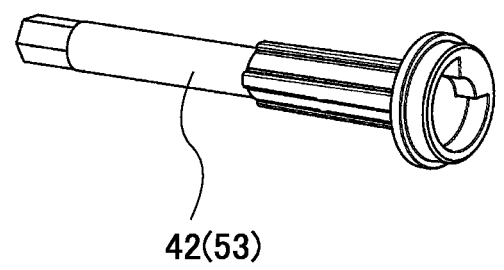
FIG. 21 is a perspective view of a main part of a lid opening/closing structure according to a first modification.
Figure 22:
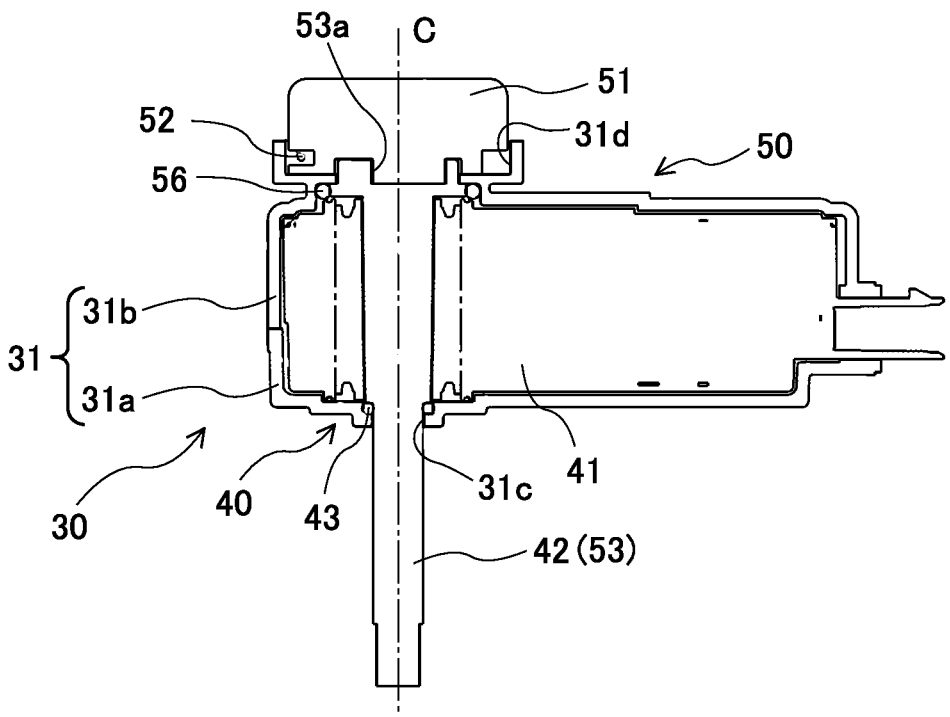
FIG. 22 is a cross-sectional view of a main part of the lid opening/closing structure according to the first modification.

Meanwhile, in each of the above first to fourth embodiments, the rotation shaft 42 of the first power-applying mechanism 40 and the transmission member 53, 123, 223, or 323 of the second power-applying mechanism 50, 120, 220, or 320 are formed as separate members. However, the present invention is not limited thereto, and the rotation shaft 42 and the transmission member 53, 123, 223, or 323 may be formed so as to be integrated with each other. FIG. 21 and FIG. 22 show a member formed by integrating the rotation shaft 42 and the transmission member 53 in the first embodiment with each other.

Figure 23:
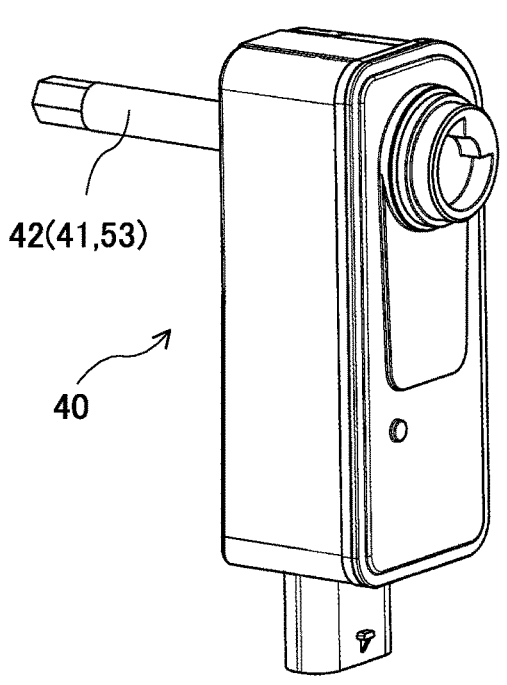
FIG. 23 is a perspective view of a main part of a lid opening/closing structure according to a second modification.
Figure 24:
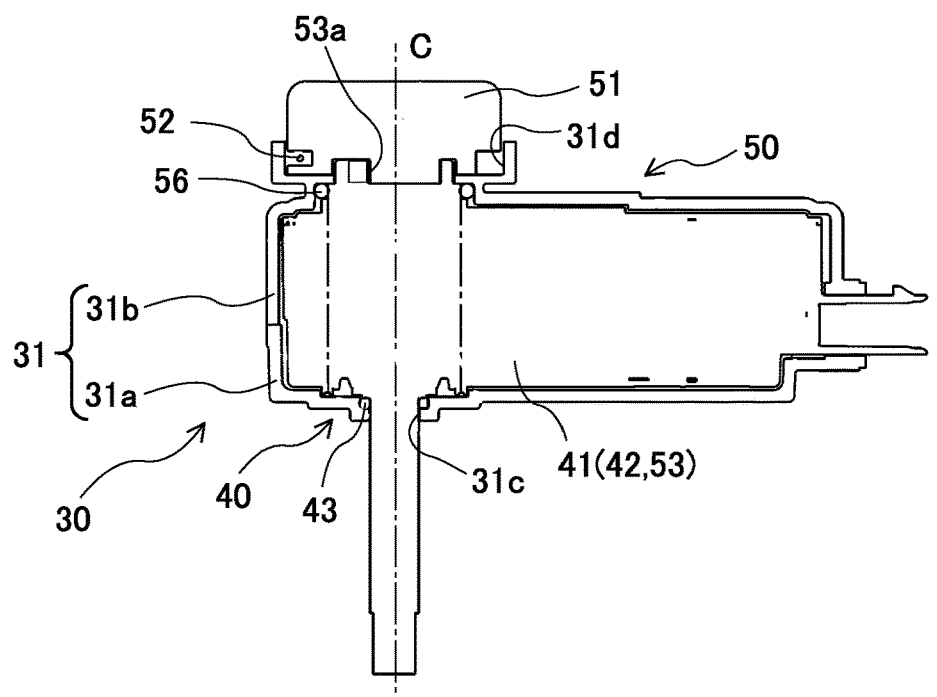
FIG. 24 is a cross-sectional view of a main part of the lid opening/closing structure according to the second modification.

Moreover, in each of the above first to fourth embodiments, the rotation shaft 42 of the first power-applying mechanism 40, the transmission member 53, 123, 223, or 323 of the second power-applying mechanism 50, 120, 220, or 320, and the electric actuator 41 are formed as separate members. However, the present invention is not limited thereto, and the rotation shaft 42, the transmission member 53, 123, 223, or 323, and the electric actuator 41 may be formed so as to be integrated with each other. FIG. 23 and FIG. 24 show a member formed by integrating the rotation shaft 42, the transmission member 53, and the electric actuator 41 in the first embodiment with each other.

The present invention is not limited to the embodiments and modifications described above, and various changes may be made without departing from the gist of the present invention. In addition, the present application discloses not only the technical ideas indicated by a quotation relationship of each claim at the time of filing, but also the technical ideas obtained by appropriately combining components described in each claim.

The invention claimed is:

1. A lid opening/closing structure comprising:

a lid openable/closable with respect to a base member between a fully-closed position and a fully-opened position;

a first power-applying mechanism including an electric actuator which generates first power and configured to apply, to the lid, the first power for opening/closing the lid with respect to the base member; and a second power-applying mechanism configured to apply, to the lid, second power generated by an external force operation, the second power being different from the first power and being for opening/closing the lid with respect to the base member by the external force operation, wherein the second power-applying mechanism has an engagement portion and a to-be-engaged portion capable of being engaged with the engagement portion, and the engagement portion and the to-be-engaged portion are not engaged with each other when the lid is opened/closed between the fully-closed position and the fully-opened position by the first power, and are engaged with each other such that the lid is opened/closed by the second power being applied to the lid when the external force operation is performed.

2. The lid opening/closing structure according to claim 1, wherein the first power-applying mechanism has a rotatable rotation shaft interposed between the electric actuator and the lid and configured to apply the first power to the lid, the second power-applying mechanism has an emergency operation member operated by an external force, and a transmission member configured to transmit the second power by an operation of the emergency operation member to the lid via the rotatable rotation shaft, the engagement portion is provided to the emergency operation member, the to-be-engaged portion is provided to the transmission member, and the engagement portion and the to-be-engaged portion are not engaged with each other when the rotatable rotation shaft is rotated by the first power, and are engaged with each other such that the rotatable rotation shaft is rotated by the second power when the emergency operation member is operated.

3. The lid opening/closing structure according to claim 2, wherein the transmission member applies the second power by the operation of the emergency operation member to the rotatable rotation shaft via the electric actuator.

4. The lid opening/closing structure according to claim 2, wherein the rotatable rotation shaft and the transmission member are coupled to or integrated with each other, and when the rotatable rotation shaft is rotated by the first power, the transmission member rotates in an idle angular range where the engagement portion and the to-be-engaged portion are not engaged with each other, and when the emergency operation member is operated, the transmission member rotates in a state where the engagement portion and the to-be-engaged portion are engaged with each other.

5. The lid opening/closing structure according to claim 4, wherein the rotatable rotation shaft, the electric actuator, and the transmission member are integrated with each other.

6. The lid opening/closing structure according to claim 2, wherein the emergency operation member is operated via an external force applying part configured to apply the external force.

7. The lid opening/closing structure according to claim 1, wherein for applying of the first power, the electric actuator is rotationally driven in a first direction in accordance with an opening command from a controller and is rotationally driven in a second direction opposite to the first direction in accordance with a closing command from a controller.

8. The lid opening/closing structure according to claim 1, wherein the first power-applying mechanism includes a rotatable rotation shaft that applies the first power to the lid and that is configured to be driven by the first power in an idle angular range where the engagement portion and the to-be-engaged portion are not engaged with each other, and the second power-applying mechanism includes an emergency operation member that rotationally operates to bring the to-be-engaged portion and the engagement portion into engagement with each other so as to rotate around an axis of the rotatable rotation shaft, and rotates the rotatable rotation shaft and transmit the second power to the lid in a state where the engagement portion and the to-be-engaged portion are engaged with each other.

\*  \*  \*  \*  \*